US 007650571 B2

(12) United States Patent
Sinai (10) Patent No.: US 7,650,571 B2
(45) Date of Patent: Jan. 19, 2010

(54) SMART LINKS AND DYNAMIC FAVORITES (75) Inventor: Eyal Sinai, Kfar Saba (IL)

(73) Assignee: SAP Portals Israel Ltd., Ra'anana (IL)

( * ) Notice: Subject to any disclaimer, the term of this patent is extended or adjusted under 35 U.S.C. 154(b) by 404 days.

(21) Appl. No.: 11/647,121

(22) Filed: Dec. 27, 2006

(65) Prior Publication Data
US 2008/0162508 A1    Jul. 3, 2008

(51) Int. Cl.
G06F 13/00 (2006.01)
G06F 15/00 (2006.01)

(52) U.S. Cl. ..................................... 715/738
(58) Field of Classification Search ......... 715/736–740, 715/851–855, 763–765, 849, 840; 709/224, 709/229; 707/2, 10
See application file for complete search history.

(56) References Cited

U.S. PATENT DOCUMENTS 6,230,196 B1 * 5/2001 Guenthner et al. .......... 709/223
7,233,950 B2 * 6/2007 Smith, III .................... 707/10

* cited by examiner

Primary Examiner—Cao (Kevin) Nguyen
(74) Attorney, Agent, or Firm—Buckley, Maschoff & Talwalkar LLC (57) ABSTRACT Methods and systems are disclosed for browser operation that enable a user to automatically create and maintain links to browsed resources meeting selection criteria. Two species of such links are disclosed, known as "smart links" and "dynamic favorites". Creation of these links enable automatic creation and maintenance of dynamic libraries of links to network resources. These libraries are sharable with collaborators.

22 Claims, 6 Drawing Sheets

```
⊟─☐ SEN
   ⊟─☐ Configuration
      ⊞─☐ Favorites
      ⊟─☐ Sites
         ⊟─☐ MonitorSite1
            ─☐ DefaultMonitorParam1
            ─☐ MonitorParam1
            ─☐ MonitorParam2
         ⊞─☐ MonitorSite2
         ⊞─☐ MonitorSite3
   ⊞─☐ Runtime
```

FIG. 7

| | Name | Type | Data |
|---|---|---|---|
| | (Default) | REG_SZ | (value not set) |
| 702 | ConfigurationId | REG_DWORD | 0x00000003 (3) |
| 704 | Key | REG_SZ | {SiteGroup1}{SiteGroup2}{SiteGroup3} |
| 706 | Title | REG_SZ | {SiteGroup1}{SiteGroup2}{SiteGroup3} |
| 708 | URL | REG_SZ | {SiteGroup1}{SiteGroup2}{SiteGroup3} |
| 710 | URLRegularExpression | REG_SZ | {https?://[^/?#:]*}{:?[)-9]*}{/test},* |

FIG. 8

```
⊟─☐ SEN
   ⊟─☐ Configuration
      ⊟─☐ Favorites
         ─☐ Favorite1
```

FIG. 9

| | Name | Type | Data |
|---|---|---|---|
| | (Default) | REG_SZ | (value not set) |
| 902 | ConfigurationIds | REG_SZ | 1 |
| 904 | Title | REG_SZ | specificURL |
| 906 | URL | REG_SZ | {SiteGroup1}{SiteGroup2}{SiteGroup3}/SpecificURL?param=3 |

FIG. 11

SMART LINKS AND DYNAMIC FAVORITES

BACKGROUND OF THE INVENTION

1. Field of the Invention

This invention relates to computerized information access and retrieval. More particularly, this invention relates to dynamic organization of browser links to information retrievable over a data network.

2. Description of the Related Art

With the advances in computer processing power and network capabilities over the past decade, the popularity of graphical user interfaces for viewing information over a network has increased substantially. Most interfaces today use graphics to convey information in a manner that is not only more pleasing to the eye, but also allows data to be manipulated and presented in ways not possible with pure text.

The first graphical user interfaces for networks were primitive and not entirely intuitive. A user would have to type complex commands to select the data to be displayed or to change the manner the data is displayed. Searches also required complex commands that were not very different from those used for text-based interfaces. However, searches were often the only way to find the desired data, since these primitive interfaces were not able to take full advantage of the links, to the extent that they existed, to quickly move a user from one set of data to another related set of data.

Today, browsers with graphical user interfaces are often used for viewing data across a network. Examples of popular browsers being used today are Mozilla Firefox™ and Microsoft® Internet Explorer™. Today's browsers can take advantage of links between related sets of data, and use these links to navigate among the various sets, including going up and down data hierarchies and revisiting previously viewed data.

While browsers and their graphical user interfaces are becoming increasingly sophisticated, the underlying data itself has become more complex. Data may be organized into huge databases of information that is spread across a network. Data may be organized into objects, including applications and related files, or groups thereof. This data may be organized in larger hierarchies, often many levels deep.

It has become a challenge to locate desired data in a clear and efficient manner through networks. Browsers can display only a limited amount of information on a user's screen at any given time. Although most browsers allow users to create bookmarks for a given set of data, bookmarks are not automatically created, and require extra effort to generate. Many browsers also keep a list of recently accessed data, but users are then required to have the list displayed on the screen (taking up valuable screen space) and then remember which set of data is the desired set, or manually set up searches for desired links or data.

U.S. Pat. No. 6,434,564, issued to Ebert, whose disclosure is herein incorporated by reference, describes a browser for viewing data organized in a hierarchical structure in which a user can interact with links to the data. A retrieved set of data is displayed in a "lens", and subsequently retrieved sets of data that are deeper in the hierarchical structure are displayed in further stacked lenses, creating a visual representation of the hierarchy. A label on each lens provides information on the data originally displayed in the lens.

SUMMARY OF THE INVENTION

As the number of bookmarks increases, it becomes more difficult for the user to quickly find a particular bookmark. This problem may be alleviated somewhat by having a hierarchical structure of bookmarks. However, this is far from a perfect solution, as an increasingly complicated hierarchical structure of bookmarks makes it even more difficult for a user to find a particular link, and time is wasted going through the various levels of the hierarchical structure. Thus, there is also a need to organize links in a manner that makes them readily accessible.

According to disclosed embodiments of the invention, as a user browses a data network, the network address of an accessed resource is automatically stored as a link, and becomes available for re-access, if it satisfies a criterion predefined by the user. Such a link is referred to herein as a "smart link".

In another aspect of the invention, the user can provide for construction of a new favorite link, known as a "dynamic favorite", which is composed of a combination of (1) static user-defined information and (2) dynamic information. The dynamic part of such a link may consist of all or part of the URL of the most recently accessed resource satisfying a specified criterion, typically a smart link. Since the dynamic part of the link changes whenever a different resource is accessed meeting the specified criterion, the link as a whole is referred to as "dynamic".

The provision of smart links and dynamic favorites according to aspects of the invention enable a user to automatically create dynamic libraries of links to network resources, for example resources relating to particular projects. These libraries are sharable with collaborators.

An embodiment of the invention provides a computer implemented method of managing links to resources on a network, which is carried out by specifying a selection criterion, accessing one of the resources via the network, automatically determining that the accessed resource meets the criterion, and responsively to the determination, creating a new link to the accessed resource.

An aspect of the method includes adding the new link to a collection of links that were created in previous iterations of new link creation, and displaying the collection according to a time of last use of members thereof.

In another aspect of the method, the new link is created automatically.

According to a further aspect of the method, the criterion is a match between a network address of the accessed resource and a regular expression.

According to yet another aspect of the method, the criterion includes a match between a content of the resource and a regular expression.

One aspect of the method is carried out by defining a specification for a dynamic link that is based on the new link, visually presenting a first dynamic link to a network resource that complies with the specification, thereafter accessing a second resource via the network that is compliant with the selection criterion, and automatically replacing the first dynamic link with a second dynamic link. The second dynamic link is derived from the second resource and is compliant with the specification.

According to yet another aspect of the method, the selection criterion includes a regular expression having a marked subexpression. Compliance with the specification includes a match with the subexpression.

In a further aspect of the method, a resource to be accessed requires a login procedure. Creating a new link includes storing login parameters. The resource to be accessed is accessed a second time by automatically performing the login procedure using the login parameters. Parameters relating to other objects needing to be exchanged with a server holding the resource may be stored.

An embodiment of the invention provides a computer implemented method of managing links to resources on a network, which is carried out by defining a specification for a dynamic link, presenting a first dynamic link on a browser to a network resource that complies with the specification, thereafter accessing a second resource via the network, wherein the second resource is compliant with the specification, and automatically replacing the first dynamic link with a second dynamic link. The second dynamic link is derived from the second resource and is compliant with the specification.

Computer software products and apparatus for carrying out the above-noted methods are provided in other embodiments of the invention.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well-known and will not be further discussed herein.

Figure 1:
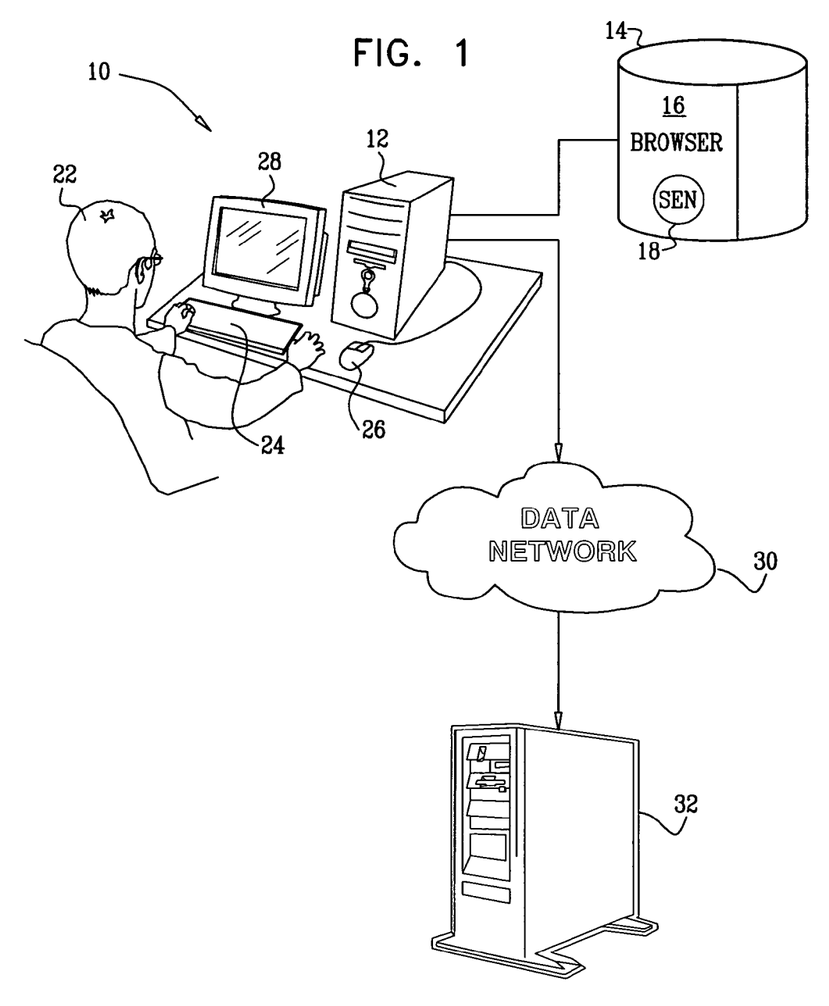
FIG. 1 is a pictorial diagram of a data processing system in which the invention may be implemented.

Turning now to the drawings, reference is initially made to FIG. 1, which is a high level diagram of an exemplary system 10, which is suitable for carrying out the present invention. The system 10 may be built around a general purpose computer 12, which is provided with a memory 14 for storage of executables and data, and which is programmed with suitable software for carrying out the functions described hereinbelow. Thus, although the system 10 is shown as comprising a number of separate functional blocks, these blocks are not necessarily separate physical entities, but rather represent different computing tasks or data objects stored in a memory that is accessible to the processor. These tasks may be carried out in software running on a single processor, or on multiple processors. The software may be provided to the processor or processors on tangible media, such as CD-ROM or non-volatile memory. Alternatively or additionally, the system 10 may comprise a digital signal processor or hard-wired logic.

The memory 14 is typically realized as a hard disk. Alternatively, the computer 12 may use other known types of memory alone or in combination with the hard disk as the memory 14. In particular, the memory 14 stores applications including a browser 16, which has been modified to embody the teachings of the present invention, as explained in further detail herein below. In a current embodiment, a plug-in, referenced as SEN 18, generates a toolbar on screen displays of the browser 16. A user 22 can interact with the computer 12 generally, and the toolbar in particular, using a keyboard 24, a mouse 26 and a display 28. The computer 12 is linked to a data network 30, which can be the Internet. The network 30 typically links the computer 12 to many different servers, all of which are accessible using the browser 16. These servers are shown representatively in FIG. 1 as a single server 32.

The architecture depicted in FIG. 1 is provided solely for illustrating and explaining the present invention, and is not meant to imply any architectural limitations.

General Operation

The following screen displays illustrate aspects of the operation of a browser as enhanced by SEN 18.

Figure 2:
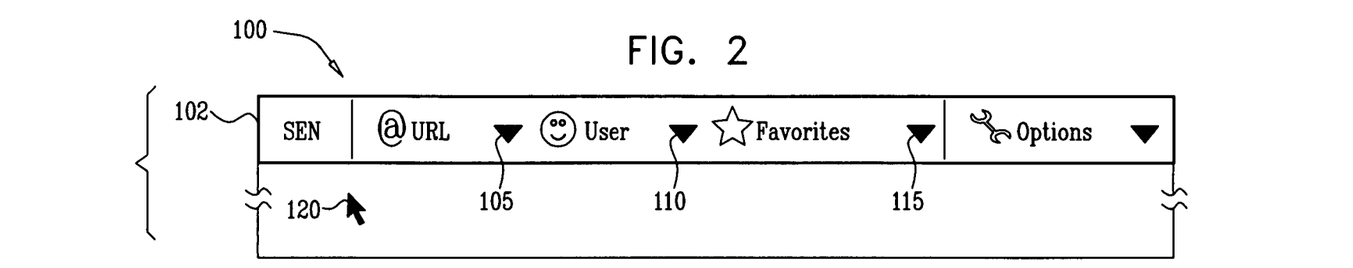
FIG. 2 is a screen display produced by a disclosed embodiment of the invention.

Reference is now made to FIG. 2, which is a screen display 100 produced on the display 28 (FIG. 1), in accordance with a disclosed embodiment of the invention. A toolbar 102 is output by SEN 18 (FIG. 1) and comprises an icon 105 for accessing smart links, an icon 110 for accessing links for automatic login and an icon 115 for accessing dynamic favorites. An arrow 120 is also shown, which moves on the display 28 (FIG. 1) as the user moves the mouse 26 (FIG. 1). In the embodiment of FIG. 1, SEN 18 interacts with Microsoft Internet Explorer, which is suitable for use as the browser 16.

Construction of a toolbar for Internet Explorer is documented on the Help and Support web site of the Microsoft Corporation. However, the principles behind the invention can be applied to other browsers.

After smart links have been stored, as described in further detail hereinbelow, the user 22 (FIG. 1) may select a smart link by first moving the mouse 26 (FIG. 1) so that the arrow 120 moves over the icon 105 and then clicking to reveal a drop-down menu of smart links.

Figure 3:
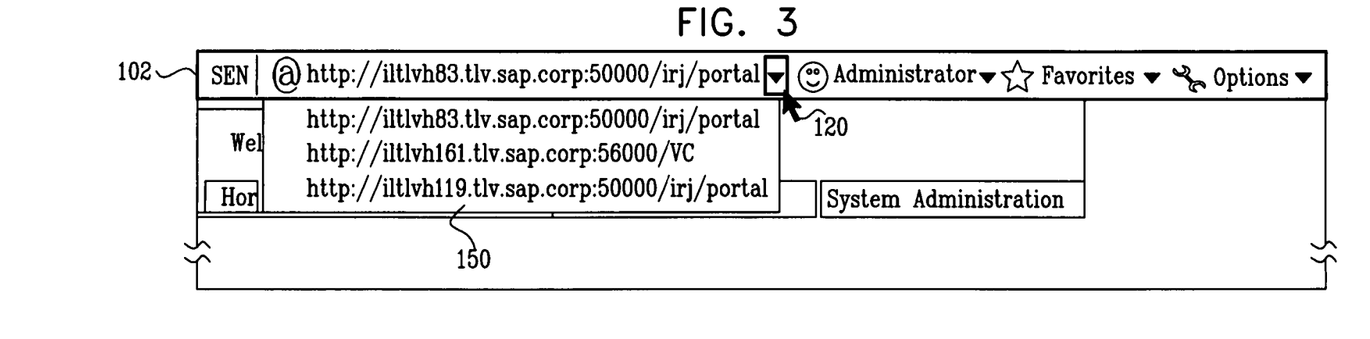
FIG. 3 shows a list of smart links on the screen display of FIG. 2, in accordance with a disclosed embodiment of the invention.

Reference is now made to FIG. 3, which shows a list of smart links on the screen display of FIG. 2, as output by SEN 18 (FIG. 1) in accordance with a disclosed embodiment of the invention. The user 22 (FIG. 1) then moves the mouse 26 (FIG. 1) so that the arrow 120 moves over a smart link 150 and he clicks to select and retrieve the link.

Referring again to FIG. 1, SEN 18 also stores a form of smart link that is configured for automatic login, as described in further detail hereinbelow. After such links have been stored, the user 22 may select one of them by first moving the mouse 26 so that the arrow 120 (FIG. 2) moves over the icon 110 (FIG. 2) and then clicking to reveal a drop-down menu of links for automatic login.

Storing and monitoring of parameters in a smart link is not restricted to login parameters, but may include other objects and parameters that need to be exchanged between the client and the server. When such an object or parameter is identified, a new entry is added in the implementation configuration. An example of such a parameter is customer identification (customerID). Using this parameter, it is possible to monitor all the customers being referenced within an application, simply by changing the configuration and the URL that contains the customer identification.

Figure 4:
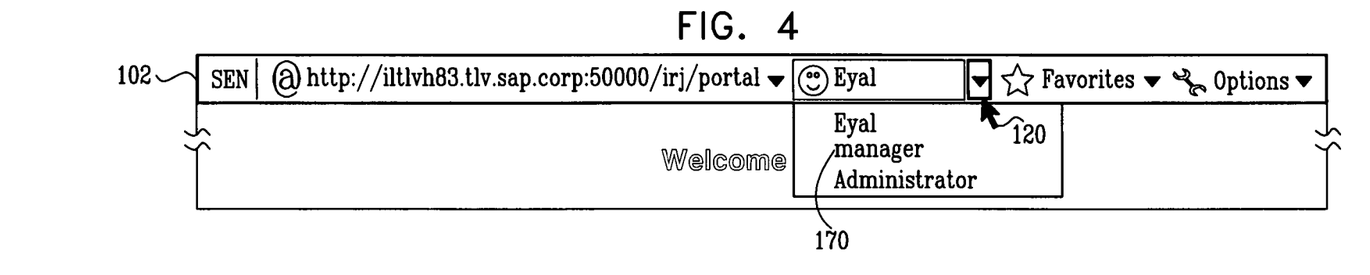
FIG. 4 shows a list of links on the screen display of FIG. 2, suitable for automatic login, in accordance with a disclosed embodiment of the invention.

Reference is now made to FIG. 4, which shows a list of links on the screen display of FIG. 2, suitable for automatic login, as output by SEN 18 (FIG. 1) in accordance with a disclosed embodiment of the invention. The user 22 (FIG. 1) then moves the mouse 26 (FIG. 1) so that the arrow 120 moves over a link for automatic login 170 and may click to select and retrieve the target of the link. The user 22 (FIG. 1) may select a dynamic favorite by first moving the mouse 26 (FIG. 1) so that the arrow 120 moves over the icon 115 (FIG. 2) and then clicking to reveal a drop-down menu of dynamic favorites.

Figure 5:
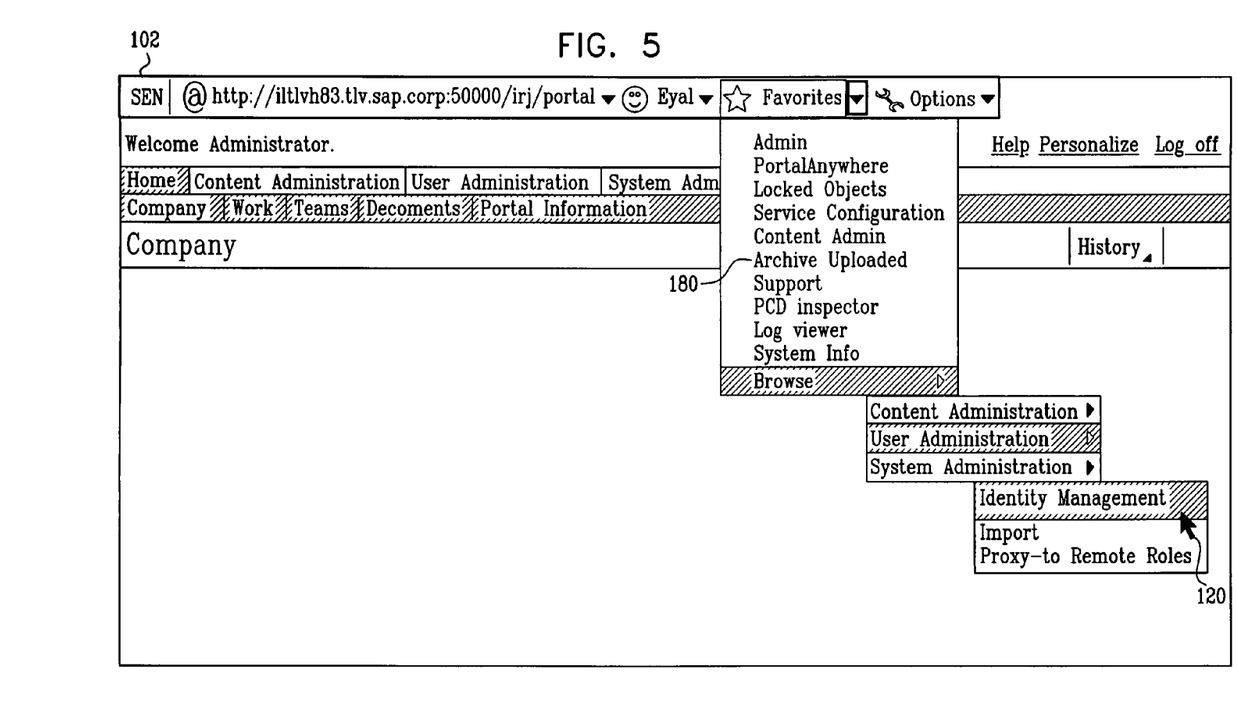
FIG. 5 shows a list of dynamic favorites on the screen display of FIG. 2, in accordance with a disclosed embodiment of the invention.

Reference is now made to FIG. 5, which shows a list of dynamic favorites on the screen display of FIG. 2, as output by SEN 18 (FIG. 1) in accordance with a disclosed embodiment of the invention. The user 22 (FIG. 1) then moves the mouse 26 (FIG. 1) so that the arrow 120 moves over a dynamic favorite 180 and may click to select and retrieve the link.

Typically, the criterion for creation of a smart link is a match of a regular expression with a network address or title of a resource. Additionally or alternatively, a criterion for creation of a smart link may be a match with a regular expression and the content of a resource. The system includes "hooks", which are used to scan content of accessed resources to determine whether the content satisfies a selection criterion. Those "hooks" are part of the extensibility that browsers provides. For example, in Microsoft Internet Explorer, the hooks enable a call to be received for every navigation operation, enabling programmatic access to document content.

Typically, a dynamic favorite is constructed as a combination of one or more backreferences to marked subexpressions of the regular expression that defined a corresponding smart link.

In some embodiments, a backreference to the complete URL of a network resource just retrieved may be specified in the definition of a special type of dynamic favorite, without reference to a smart link. In this case, the dynamic favorite is updated when it is accessed.

Regular expressions, as well as backreferences to marked subexpressions within regular expressions, are well known in the computer arts, and are therefore not further discussed in detail herein.

Figure 6:
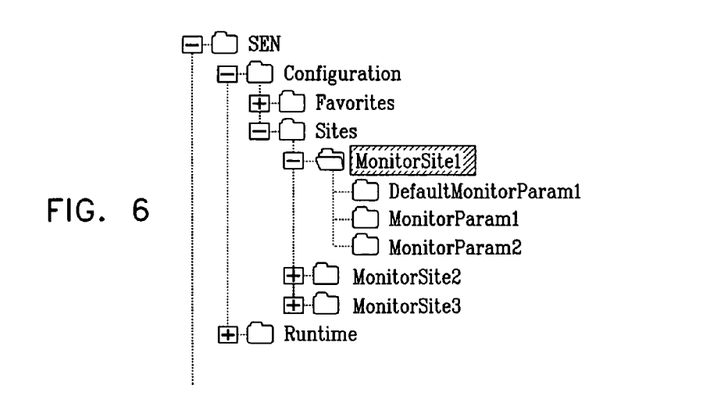
FIG. 6 is a screen display illustrating a step in a configuration procedure for enabling collection of smart links, in accordance with a disclosed embodiment of the invention.

Reference is now made to FIG. 6, which is a screen display illustrating a step in a configuration procedure enabling collection of smart links by SEN 18 (FIG. 1), in accordance with a disclosed embodiment of the invention. The configuration for SEN is stored in the registry used by Microsoft Windows®, and can be edited using regedit, a well-known utility provided by the Microsoft corporation for that purpose. Configuration parameters for SEN 18 are initially set up when SEN is installed, using the CRegKey object. Documentation for this object is available from the Microsoft corporation. FIG. 6 shows exemplary configuration parameters, it being understood that in different embodiments, other parameters may be used to configure SEN 18.

Alternatively, and in embodiments for other operating systems, the configuration may be stored in one or more text files, which can be edited using a standard editor.

In some embodiments, a user interface may be provided for configuring SEN 18 to process smart links, including links for automatic login, and dynamic favorites. Use of the user interface is particularly suitable for unskilled users, as it avoids direct manipulation of the Windows registry.

Configuration

Figure 7:
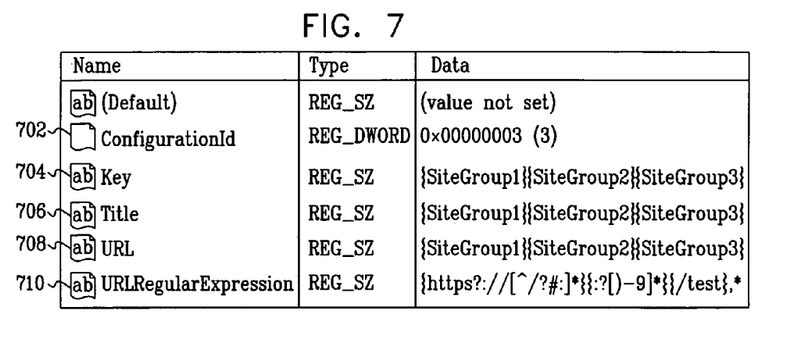
FIG. 7 is a screen display illustrating a result of the configuration procedure of FIG. 6, in accordance with a disclosed embodiment of the invention.

Reference is now made to FIG. 7, which is a screen display showing an exemplary result of configuring SEN 18 (FIG. 1) to collect smart links, in accordance with a disclosed embodiment of the invention. The parameters defined are as follows, and are implemented as keys in the Windows registry:

A parameter ConfigurationId 702 is an arbitrary number that is used to distinguish one smart link configuration from any other smart link configuration. It is not significant in the definition of the smart link itself, but is important when defining a dynamic favorite based on the smart link configuration.

A parameter Key 704 is derived from the URL to express its uniqueness. If a URL is retrieved whose key is the same as that of an existing smart link, the new smart link will replace the old smart link. Typically, the parameter Key 704 is identical to the URL. Indeed, some embodiments of the invention may not implement the parameter Key 704 but use the URL instead. In FIG. 7, the parameter Key 704 consists of the first three marked subexpressions of the URL.

A parameter Title 706 is how the smart link appears in the list of smart links presented to the user (150 in FIG. 3).

A parameter URL 708 is the actual link that will be retrieved when the smart link is selected. This is done by moving the mouse 26 (FIG. 1) so that the arrow 120 (FIG. 3) moves over the smart link title 150 (FIG. 3) and clicking.

A parameter URLRegularExpression 710 is the regular expression used to match the URL retrieved by the browser, to determine if the URL should be added to the collection of smart links.

It is also possible to configure additional links as login links, which pass parameters additionally or alternatively to the URL.

Figure 8:
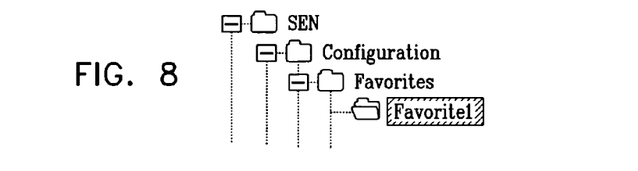
FIG. 8 is a screen display illustrating a step in a configuration procedure enabling construction of dynamic favorites, in accordance with a disclosed embodiment of the invention.

Reference is now made to FIG. 8, which is a screen display showing a step in the configuration of SEN 18 (FIG. 1) to create a dynamic favorite, in accordance with a disclosed embodiment of the invention. The method of configuration is similar to the method of configuring smart links described above, and its description is not repeated in the interest of brevity. Dynamic favorites are usually created by reference to smart links. By selecting combinations of elements of a smart link, or by supplementing a constant portion of a smart link by variable elements, it is possible to spawn any number of dynamic favorites from that smart link.

Figure 9:
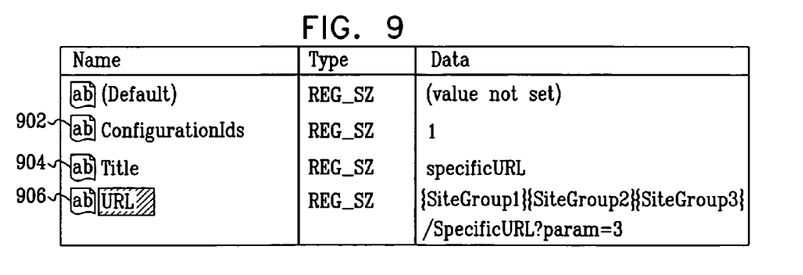
FIG. 9 is a screen display illustrating a result of the configuration procedure of FIG. 8, in accordance with a disclosed embodiment of the invention.

Reference is now made to FIG. 9, which is a screen display showing the result of configuring SEN 18 (FIG. 1) to create a dynamic favorite, in accordance with a disclosed embodiment of the invention. The parameters defined are as follows:

In a comma-separated list of numbers, referenced as ConfigurationIds 902, each number is an instance of the parameter ConfigurationId 702 (FIG. 7) for a smart link configuration, and indicates that a dynamic favorite can be constructed from a corresponding smart link. The symbol "*" indicates that the dynamic favorite can be constructed from all smart links.

A parameter Title 904 is a descriptor for a dynamic favorite in the list of dynamic favorites presented to the user e.g., the dynamic favorite 180 (FIG. 5).

A parameter URL 906 is an indicator of the actual link that will be retrieved when a corresponding dynamic favorite is selected, as described above.

Many other dynamic elements will occur to those skilled in the art, and can be incorporated in the configuration of SEN 18 (FIG. 1). For example, in addition to the URL (or substring thereof), data items such as cookie information might be applied to the formation of dynamic favorites. It is only necessary that the dynamic elements be known at the time the favorite is clicked.

Referring again to FIG. 5, an alternative method of configuring SEN 18 (FIG. 1) to create a dynamic favorite based on a smart link is shown, in accordance with a disclosed embodiment of the invention. The user moves the mouse 26 (FIG. 1) so that the arrow 120 (FIG. 2) moves over icon 115 (FIG. 2) and then clicks to reveal a drop-down menu of dynamic favorites. The user then moves the mouse 26 (FIG. 1) so that the arrow 120 passes over the last entry (not a dynamic favorite). This reveals another menu. Typically, the last entry of this menu is an invitation to add a new favorite ("Add new favorite"). The user supplies the an indicator of the URL of the new favorite, which may be a regular expression.

Implementation

Figure 10:
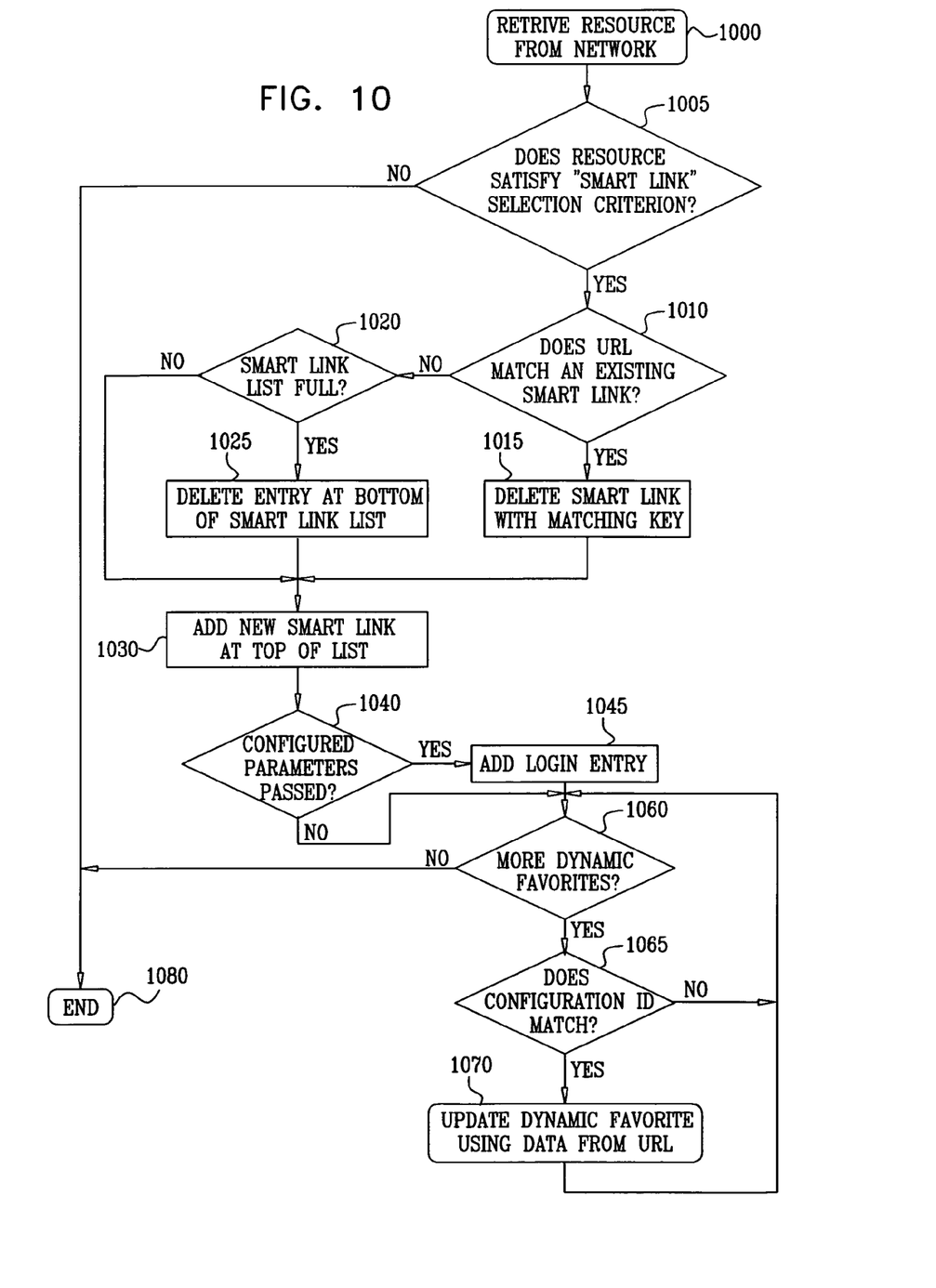
FIG. 10 is a flow chart illustrating a method of collection of smart links and transformation thereof into dynamic favorites in accordance with a disclosed embodiment of the invention.

Reference is now made to FIG. 10, which is a flow chart illustrating a method of collecting smart links and constructing dynamic favorites in accordance with a disclosed embodiment of the invention. For convenience of presentation, the method is sometimes described with reference to SEN 18 and the embodiment of FIG. 1, it being understood that this is exemplary and not by way of limitation. It is assumed that criteria for a prospective smart link have defined by the user, as explained above in the discussion of the configuration of SEN 18 (FIG. 1).

At initial step 1000, a resource is retrieved from a network. The user may do this using well known user interfaces provided by the browser. Alternatively, the user may select a smart link, a dynamic favorite or a link for automatic login as described above.

For example, in the embodiment of FIG. 1, suppose that the URL refers to a resource on the server 32. The system 10 initially sends a request to a DNS (Domain Name System) server (not shown) to convert the location of the server 32 to an IP address (unless the URL already contains the IP address). This is the IP address of the server 32. The system 10 then sends a request to the server 32 to retrieve the resource specified by the URL. It should be understood that the resource may contain objects, for example, embedded images, which must be retrieved from the server 32, or from other servers on the network 30, in the same way. Alternatively, in portal environments, the facilities of the portal may be invoked to retrieve the designated resource.

If the resource has been retrieved successfully, SEN 18 receives a notification. When used in conjunction with Internet Explorer, this is an event DISPID_BEFORENAVIGATE2.

Referring again to FIG. 10, control continues at step 1005. A determination is made whether the address of the resource retrieved meets the current criteria to qualify as a smart link and to add the smart link to a current collection of smart links. If the determination at decision step 1005 is negative, control exits at final step 1080.

If the determination at decision step 1005 is affirmative, the user is optionally prompted for confirmation before creating the smart link. Alternatively, creation of the smart link occurs automatically and without human intervention.

Control proceeds to step 1010. A determination is made whether the key of the URL for the resource retrieved matches the key of an existing smart link. This is done by searching the list of smart links.

Figure 11:
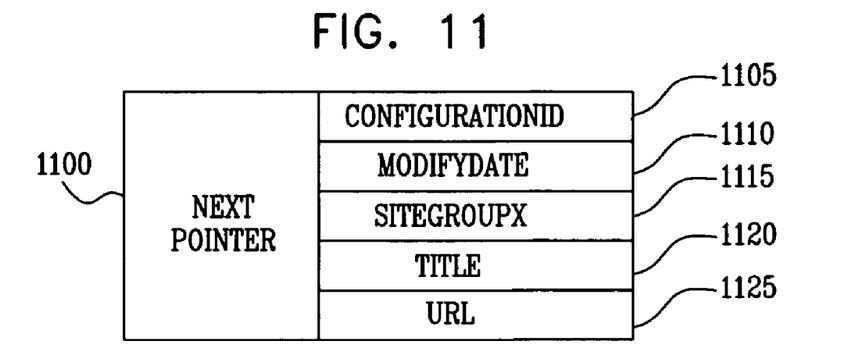
FIG. 11 is a diagrammatic representation of the information stored in a smart link in accordance with a disclosed embodiment of the invention.

Reference is now made to FIG. 11, which is a diagrammatic representation of the information stored in a smart link collected by SEN. Smart links are typically stored as nodes in a linked list. However, many other data structures for maintaining the smart links can be used, as will occur to those skilled in the art. Typically, the list is ordered chronologically based on time of last use, with the most recently used link at the head of the list, and this is the order in which the links appear to the user in FIG. 3. It should be understood that other orderings of the list (e.g., most frequently used first, alphabetical) are also possible and are within the spirit and scope of the present invention.

Smart links are stored in memory, and may be stored in the registry used by the Microsoft Windows operating system, so that they will be preserved for use in a subsequent browser session. If desired, the registry entries can be exported for use by collaborators.

The smart link comprises:

a pointer 1100 containing the location in memory of the next node in the list;

a parameter ConfigurationId 1105, which is a configuration identity used to match corresponding dynamic favorites with smart links;

a date ModifyDate 1110, which indicates the date that this smart link was created;

a list of marked subexpressions SiteGroupX 1115 of the regular expression, extracted from the original URL, i.e., the URL that was being accessed at the time the smart link was created;

a parameter Title 1120, which is the title of the smart link; and a parameter URL 1125, which is the network address of the smart link.

The parameter URL 1125 may be replaced by a descriptor for a URL. Not all the data listed above may be necessary, and portions may be omitted in some embodiments. Furthermore, additional information, which may occur to those skilled in the art, may be included.

If the URL matches two smart links, both links will be added. For example,

"http://host:port/irj/portal", and

"http://host:port/irj/portal/a1s".

When navigating to the second site, two smart links are added, only one of which is current/active. The active link is shown in the button description on the toolbar. The dynamic favorites shown are those which were configured using the same configuration ID as the current smart link.

Referring again to FIG. 10, if the determination at decision step 1010 is affirmative, control passes to step 1015. Since smart links are required to be unique, the existing version of the smart link is deleted. The purpose of the deletion is to assure that the most recent access of the resource is represented by a new smart link at the head of a list of smart links. Control passes to step 1030, which is described below. Alternatively, other list management techniques may be employed to order the current set of smart links.

If the determination at decision step 1010 is negative, control passes to step 1020. A determination is made if the list of smart links is full. There is a pre-defined and configurable maximum number of smart links.

If the determination at decision step 1020 is negative, control passes to step 1030.

If the determination at decision step 1020 is affirmative, control passes to step 1025. The node at the bottom of the list of smart links is deleted. Normally this entry is the least recently used element of the list. Control then passes to step 1030.

In step 1030 a new smart link, containing the URL of the retrieved page, is added to the top of the list of smart links. Control passes to decision step 1040.

At decision step 1040 a determination is made if the URL contains any parameters, e.g., login parameters, that have been configured for collection in association with the smart link.

If the determination at decision step 1040 is affirmative, control passes to step 1045. An entry, usually a login entry, containing parameters and corresponding values, is added to a list of links for automatic login, and in some embodiments, saved in the Microsoft Windows registry. Typically, this list is ordered chronologically based on time of last use, with the most recently used link at the head of the list, and this is the order in which the links appear to the user in FIG. 4.

Step 1060 is performed if the determination at decision step 1040 is negative, or after performing step 1045. A determination is made if there are any dynamic favorites that have not been checked against the current URL of the resource retrieved from the network.

If the determination at decision step 1060 is negative, control exits at final step 1080.

Step 1065 is performed if the determination at decision step 1060 is affirmative. A determination is made if the set of configuration identities for the dynamic favorite includes the configuration identity of the smart link configuration (from step 1005).

If the determination at decision step 1065 is negative, control iterates at step 1060.

Step 1070 is performed if the determination at decision step 1065 is affirmative. The dynamic favorite is updated using the current URL, and in some embodiments, saved in the Windows registry. Control then returns to step 1060 for another iteration.

EXAMPLE 1

A development company develops a new web application, which is sold to a number of customers. The customers install multiple instances of the application at their respective customer sites, and other sites, relating to diverse activities, e.g., development, quality assurance, quality management, customer locations.

It is occasionally required for a field engineer, who may be an employee of the developer, to work on a customer's system for a limited time. Since the work assignment is temporary, the field engineer does not wish to add links regarding the customer's installation to his favorites. However, he may require the convenience of such links for several days on the system.

SEN, implementing dynamic favorites, holds the web application link and login information and maps important locations relating to the customer's application.

EXAMPLE 2

The fictitious ACME company has a collection of web sites for different countries (www.acme.com, www.acme.co.uk, www.acme.ca, www.acme.fr, www.acme.de, www.acme.it, www.acme.co.il, etc.). The web sites have the same structure but different content. Furthermore, all the web sites share the same user database, so that a user only needs to create an account with one of the company's web sites and he can use that account with any of the other web sites.

A user has configured his browser to match any web site starting with "www.acme." as a smart link. He has also created a dynamic favorite, based on the above smart link, in which "/devices/trap/roadrunner" is appended to the smart link. Finally, he has created a login entry associated with this smart link, so that it will capture the parameters "user" and "password".

Having configured his browser as above, the user logs in by typing into his browser "www.acme.com?user=coyote&password=wily". Retrieval of the target resource results in addition of www.acme.com to his collection of smart links, so that in the future he only needs to click on this link to access the site. It also creates a login entry, which he can click to login to the site without manually entering his user name or password. Finally, it updates the dynamic favorite to "www.acme.com/devices/trap/roadrunner".

A week later, the user discovers that an object of interest is located at in Canada. Therefore, he accesses Acme's Canadian site www.acme.ca. This adds another smart link for the Canadian site. It also updates the dynamic favorite to "www.acme.ca/devices/trap/roadrunner", so that he can just click on the updated link in order to retrieve the Canadian site's web page.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer implemented method of managing links to resources on a network, comprising the steps of:
   specifying a selection criterion at a web browser device;
   accessing, by the web browser device, one of said resources via said network, wherein the accessed resource requires a login procedure;
   automatically determining at the web browser device that said accessed resource meets said criterion;
   responsively to said step of automatically determining creating at the web browser device a new link to said accessed resource, wherein said creating includes storing login parameters; and accessing the accessed resource a second time by automatically performing said login procedure using the login parameters.

2. The method according to claim 1, further comprising the steps of:
 adding said new link to a collection of links that were created in previous iterations of said step of creating a new link; and
 displaying said collection according to a time of last use of members thereof.

3. The method according to claim 1, wherein said step of creating a new link is performed automatically and without human intervention.

4. The method according to claim 1, wherein said criterion comprises a match between a network address of said accessed resource and a regular expression.

5. The method according to claim 1, wherein said criterion comprises a match between a content of said resource and a regular expression.

6. The method according to claim 1, further comprising the steps of:
 defining a specification for a dynamic link that is based on said new link;
 visually presenting a first dynamic link to a network resource that complies with said specification;
 thereafter accessing a second resource via said network that is compliant with said selection criterion; and
 automatically replacing said first dynamic link with a second dynamic link, said second dynamic link being derived from said second resource and complying with said specification.

7. The method according to claim 6, wherein said selection criterion comprises a regular expression having a marked subexpression, and wherein compliance with said specification comprises a match with said subexpression.

8. A computer software product for managing links to resources on a network, including a tangible computer-readable medium in which computer program instructions are stored, which instructions, when read by a computer, cause the computer to:
 specify a selection criterion at a web browser device;
 access, by the web browser device, one of said resources via said network, wherein the accessed resource requires a login procedure;
 create at the web browser device a new link to said accessed resource responsively to an automatic determination that said accessed resource meets said selection criterion, wherein said creating includes storing login parameters; and
 accessing the accessed resource a second time by automatically performing said login procedure using the login parameters.

9. The computer software product according to claim 8, wherein said computer is further instructed to:
 add said new link to a collection of links that were created in a previously created new link; and
 display said collection as a list.

10. The computer software product according to claim 8, wherein said computer is instructed to create said new link automatically and without human intervention.

11. The computer software product according to claim 8, wherein said selection criterion comprises a match between a network address of said accessed resource and a regular expression.

12. The computer software product according to claim 8, wherein said selection criterion comprises a match between a content of said resource and a regular expression.

13. The computer software product according to claim 8, wherein said computer is further instructed to:
 accept a specification for a dynamic link that is based on said new link;
 display a first dynamic link to a network resource that complies with said specification;
 thereafter access a second resource via said network that is compliant with said selection criterion; and
 automatically replace said first dynamic link with a second dynamic link, said second dynamic link being derived from said second resource and complying with said specification.

14. The computer software product according to claim 13, wherein said selection criterion comprises a regular expression having a marked subexpression, and wherein compliance with said specification comprises a match with said subexpression.

15. A data processing system for managing links to resources on a network, comprising:
 a processor, connected to said network; and
 a memory accessible by said processor and having a browser object residing therein for execution by said processor, said processor being operative to:
  specify a selection criterion at a web browser device;
  access, by the web browser device, one of said resources via said network using said browser object, wherein the accessed resource requires a login procedure;
  create at the web browser device a new link in said browser object to said accessed resource responsively to an automatic determination that said accessed resource meets said selection criterion, wherein said creating includes storing login parameters; and
  accessing the accessed resource a second time by automatically performing said login procedure using login parameters.

16. The data processing system according to claim 15, wherein said processor is operative to:
 add said new link to a collection of links that were created in a previously created new link; and
 display said collection as a list using said browser object.

17. The data processing system according to claim 15, wherein said processor is operative to create said new link automatically and without human intervention.

18. The data processing system according to claim 15, wherein said selection criterion comprises a match between a network address of said accessed resource and a regular expression.

19. The data processing system according to claim 15, wherein said selection criterion comprises a match between a content of said resource and a regular expression.

20. The data processing system according to claim 15, wherein said processor is operative to:
 accept a specification for a dynamic link that is based on said new link;
 display a first dynamic link to a network resource that complies with said specification;
 thereafter access a second resource via said network that is compliant with said selection criterion; and
 automatically replace said first dynamic link with a second dynamic link, said second dynamic link being derived from said second resource and complying with said specification.

21. The data processing system according to claim 20, wherein said selection criterion comprises a regular expression having a marked subexpression, and wherein compliance with said specification comprises a match with said subexpression.

22. A computer implemented method of managing links to resources on a network, comprising the steps of:
- defining at a web browser device a specification for a dynamic link;
- visually presenting at the web browser device a first dynamic link on a browser to a network resource that complies with said specification;
- thereafter accessing, the web browser device, a second resource via said network that is compliant with said specification; and
- automatically replacing at the web browser device said first dynamic link with a second dynamic link, said second dynamic link being derived from said second resource and complying with said specification, wherein said specification comprises a regular expression having a marked subexpression, and wherein compliance with said specification comprises a match with said subexpression.

* * * * *

UNITED STATES PATENT AND TRADEMARK OFFICE
CERTIFICATE OF CORRECTION

PATENT NO. : 7,650,571 B2
APPLICATION NO. : 11/647121
DATED : January 19, 2010
INVENTOR(S) : Eyal Sinai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 427 days.

Signed and Sealed this

Twenty-third Day of November, 2010

David J. Kappos
*Director of the United States Patent and Trademark Office*